United States Patent [19]
Blair

[11] Patent Number: 6,061,475
[45] Date of Patent: May 9, 2000

[54] VIDEO COMPRESSION APPARATUS AND METHOD

[75] Inventor: Bruce A. Blair, San Clemente, Calif.

[73] Assignee: Axcess, Inc., Carrollton, Tex.

[21] Appl. No.: 09/045,286

[22] Filed: Mar. 20, 1998

[51] Int. Cl.$^7$ .................................................. G06K 9/36
[52] U.S. Cl. ................................... 382/239; 382/194
[58] Field of Search ................................ 382/239, 201, 382/193, 194, 221

[56] References Cited

U.S. PATENT DOCUMENTS

| | | | |
|---|---|---|---|
| 4,420,771 | 12/1983 | Pirsch | 358/261 |
| 4,586,036 | 4/1986 | Thomason et al. | 345/24 |
| 4,816,901 | 3/1989 | Music et al. | 358/13 |
| 4,843,466 | 6/1989 | Music et al. | 358/133 |
| 4,847,677 | 7/1989 | Music et al. | 358/13 |
| 4,849,807 | 7/1989 | Music et al. | 358/13 |
| 4,857,991 | 8/1989 | Music et al. | 358/13 |
| 4,857,993 | 8/1989 | Music et al. | 358/13 |
| 4,914,508 | 4/1990 | Music et al. | 358/13 |
| 5,140,412 | 8/1992 | Shishido et al. | 358/75 |
| 5,351,084 | 9/1994 | Blair | 348/390 |
| 5,448,301 | 9/1995 | Michener | 348/578 |
| 5,526,133 | 6/1996 | Paff | 358/335 |

FOREIGN PATENT DOCUMENTS

| | | | |
|---|---|---|---|
| WO 88/04082 | 2/1988 | WIPO | G06F 15/64 |

*Primary Examiner*—Jose L. Couso
*Assistant Examiner*—Anh Hong Do
*Attorney, Agent, or Firm*—Gray Cary Ware & Freidenrich LLP

[57] ABSTRACT

The invention provides a method, and related apparatus, for improved compression of video images by determining optimum compression points using pixel-to-pixel slope comparison techniques and relaxable length limits. The method converts a digitized analog video signal into its piecewise linear equivalent, and then reduces the data stream by preserving only the break points. The linear segments may be as short as one pixel. After a predetermined slope length has been reached, the improved pointing technique combines length-limited points if the slopes of the corresponding linear segments are identical.

15 Claims, 8 Drawing Sheets

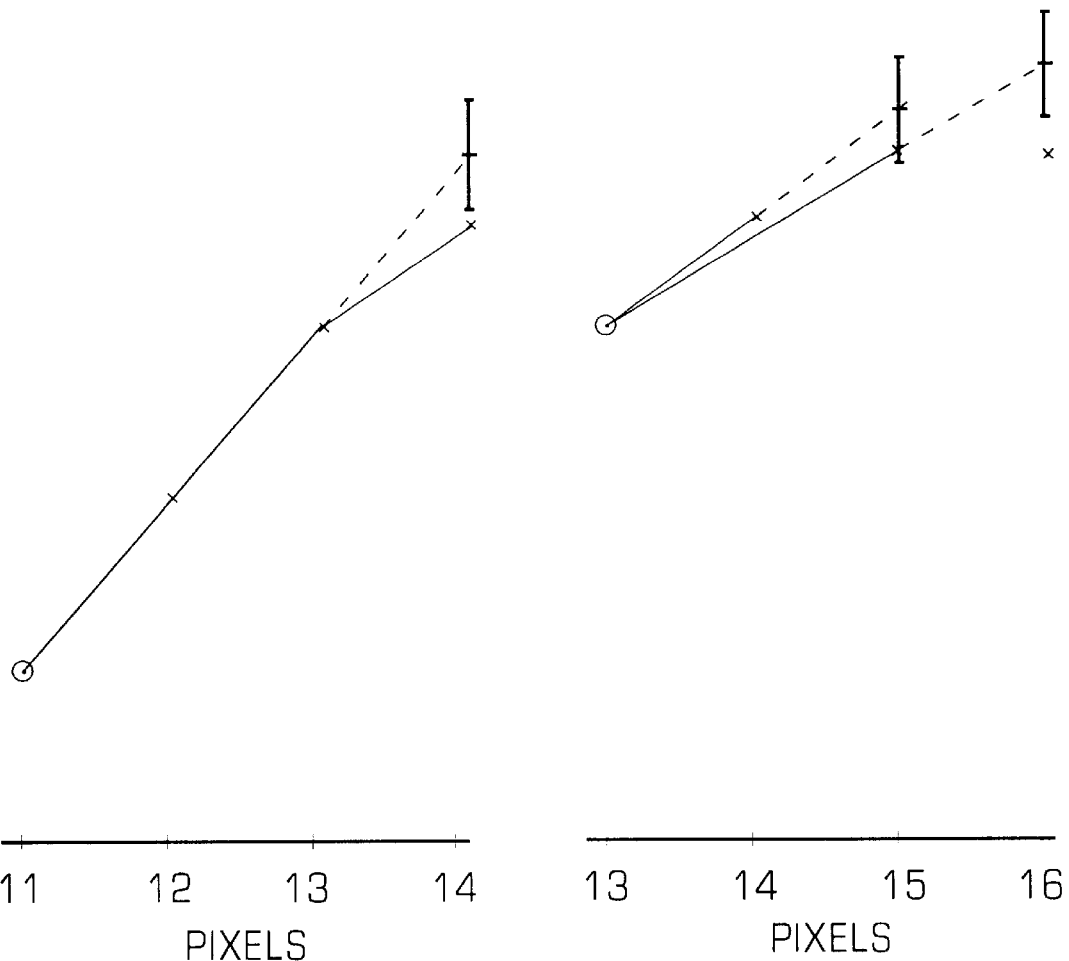

VIDEO COMPRESSION APPARATUS AND METHOD

BACKGROUND OF THE INVENTION

The present invention relates to video data compression, and more particularly, to the compression of video data for transmission at greatly reduced data rates. The invention is advantageous for the transmission of real-time video images through telephone lines.

A video compression system reduces the amount of data required to reproduce or duplicate an original image or picture. In existing video compression techniques, such as those described in U.S. Pat. Nos. 4,816,901, 4,847,677, 4,849,807 and 4,914,508, a frame of digital video data is compressed and encoded line-by-line in real time by determining points along each video line. The selected points are points of inflection that convert the video line into a series of linear segments, the points representing the end-points of the linear segments. When converted back to digital data, the points generate an acceptable reproduction of the original line.

One video compression technique disclosed in the above-identified patents requires the length between selected of a linear segment to be least 2 pixels but not more than 17 pixels. Unfortunately, this compression technique results in the selection of an excessive number of points in picture areas of rapid slope changes and picture quality suffers in areas of very flat, or low slope changes. For example, in a picture having a vertical line or sharp contrast edge, the two pixel minimum requirement results in a relatively random jagged line when the edge is located generally between horizontal pixels. Also, in a picture having a uniform picture area, i.e., a picture having very flat or low slope areas resulting in long pixel lengths between points, the line-to-line pointing location often appears random and image quality suffers.

Accordingly, there exists a definite need for video compression techniques for providing good edge definition and for providing good picture quality in regions of picture uniformity. The present invention satisfies these needs and provides further related advantages.

SUMMARY OF THE INVENTION

The present invention is embodied in a method, and related apparatus, for compressing pixel data from a digitized image representing a series of scan line. Each scan line has a plurality of segments that include a plurality of pixels having corresponding amplitude values. The method sets a scan line segment's first pixel to be a first point. The first point's amplitude value is assigned to be equal to the first pixel's amplitude value and the first point's length value is assigned to zero or other value designated to be associated only with the first point. The scan line segment's next pixel is then selected. A slope is calculated between the amplitude value of the most recently set point and the amplitude value of the selected pixel. The actual amplitude value of the next subsequent pixel is predicted using the calculated slope. The amplitude value of the next subsequent pixel is compared with the predicted amplitude value. The selected pixel is set to be a point if the value of the next subsequent pixel is not within a predetermined threshold range. If set, the next point's amplitude value is assigned to be equal to the selected pixel's amplitude value and the next point's length value is assigned to be equal to the number of pixels from the most recently set point to the next point. The minimum point length value is one. The next pixel selecting, the slope calculating step, and the amplitude value predicting steps are repeated if the value of the next subsequent pixel falls within the predetermined threshold range.

In an additional feature of the invention, prior to the repeating step, the selected pixel is set to be a point if the number of pixels from the most recently set point to the selected pixel exceeds a predetermined length value. Further, the point's amplitude values and length values are transmitted across a data link and the image is decompressed based on the transmitted point values by interpolating the pixels between the transmitted points.

In an additional feature of the invention, the slope for a first line segment between the most recently set point is compared to a currently set point with the slope for a second line segment between the most recently set point and the point set just previous to the most recently set point. The most recently set point is eliminated if the slope for the first line segment is substantially equal to the slope for the second line segment and adding the recently set point's length value to the currently set point's length value.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 4D is a more detailed view of the graph of FIG. 3, showing pixels 11 through 14 and a slope range for point selection, according to the invention.

FIG. 4E is a more detailed view of the graph of FIG. 3, showing pixels 13 through 16 and a slope range for point selection, according to the invention.

DETAILED DESCRIPTION OF THE PREFERRED EMBODIMENTS

Figure 1:
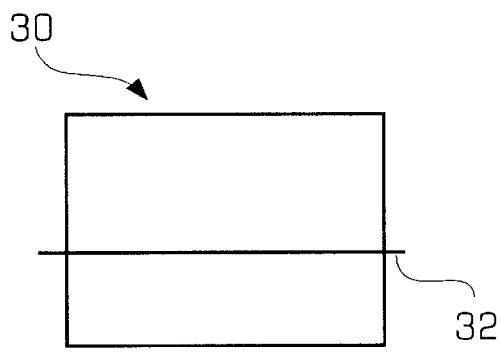
FIG. 1 is a schematic diagram of a video image display field with a highlighted scan line.

The present invention provides a method, and related apparatus, for improved compression of video images by determining optimum compression points using pixel-to-pixel slope comparison techniques and relaxable length limits. The method converts a stream of digitized video image data into piecewise linear segments as short as one pixel, and preserves only the end points of the linear segments to reduce the video data stream. After a predetermined segment length has been reached, the improved technique combines length-limited points if the slopes of the linear segments are identical.

For a series of pixels representing a video image, an optimum set of points exists that describe the original image with a minimum error. As the value of the minimum error is lowered, the points become closer to each other until, at an error value of zero, the points exactly duplicate the original series of pixels. Accordingly, the minimum error value defines a "quality" factor that indicates how faithfully the regenerated image compares with the original image. A smaller quality factor results in a closer comparison between the reproduced image and the original image.

The process for determining the points to be retained, illustrated in more detail below, begins with the value of the first pixel in the pixel series of an image scan line. The first element in the series will always be a point having a value equal to the value of the first pixel. The value of the second pixel in the series is used to determine the slope of a line from the previous point value to the second pixel value. Using this slope, a calculation is made to predict the value that the next pixel, i.e., the third pixel. This predicted value for the next pixel is compared to the actual value of the next pixel. If the difference between the predicted pixel value and the actual pixel value is less than the specified quality factor then the process steps to the next pixel (the pixel that was just compared) and computes a new slope from the most recent point to the just compared pixel. This new slope is used to predict the value of the next pixel, i.e., the fourth pixel, which is compared with the actual value of the corresponding pixel to determine if the difference is less than the specified quality level. If the error is greater than the specified quality level, then a new point is specified which has a value equal to the last pixel falling within the specified quality level and which has an associated length value equal to the number of pixels from the last specified point to the new point. This procedure of: 1) stepping to the next pixel; 2) generating a slope from the last point to present pixel for predicting the value of the next pixel; 3) comparing the predicted value of next pixel to the pixel's actual value; and 4) defining a new point or stepping to the next pixel; continues to the end of the scan line.

Although this process will generate a set of points for a given series of pixels, it may not reproduce the most acceptable image. The distance between points in relatively flat areas may become excessively large. Such flat areas generate long runs between the points thus reducing the number of points that may impairs the appearance of the regenerated image. To reduce the visibility of these long runs, the pixel length between points is restricted to eight pixels. This length restriction improves the appearance in flat areas at the expense of an increase in the number of points. To partially offset this increased number of points and to reduce the number of points in the flat slope areas while minimizing image degradation, the slopes of adjacent points are compared and the points are combined, i.e. a point is left out and the lengths are combined, if the slopes are identical. This process of selecting length restricted points with a specified quality level and subsequently combining identically sloped points has the effect of adaptively selecting points with a quality level inversely proportional to the rate of change, i.e., the slope, of the luminance component of the video data stream.

Figure 2:
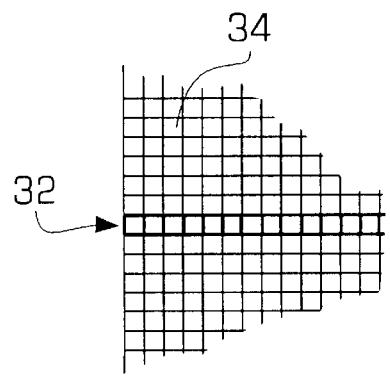
FIG. 2 is a more detailed schematic diagram of one end of the scan line of FIG. 1, showing the pixels in the highlighted scan line and the pixels in the adjacent scan lines.

With reference now to FIGS. 1 and 2, the invention is illustrated as it operates on a video image. A typical video image consists of a frame 30 of sequential horizontal scan lines 32. An analog video image is digitized to a typical resolution of 640 pixels by 480 pixels. To lower the data rate, the digital image frame is preferably reduced to 320 by 240 pixels by eliminating every other pixel. Each pixel 34 has an associated amplitude value which may be represented by 256 levels using an eight-bit byte. Each pixel row represents a scan line 32. Each scan line is reduced to a series of points using the pointing technique of the present invention.

For the purposes of illustrating the principles of the invention, a series of 28 pixels, and the associated amplitude for each pixel, is listed below in Table 1 and shown in FIG. 3.

TABLE 1

| Pixel | PV | ΔPD | L | ΔPV | M | PD | Point? | Point | VAL | PL |
|---|---|---|---|---|---|---|---|---|---|---|
| 1 | 246 | 0 | 0 | — | 0 | 246 | Yes | 1 | 246 | 0 |
| 2 | 244 | −2 | 1 | −2 | −2 | 242 | No | | | |
| 3 | 240 | −2 | 2 | −6 | −3 | 237 | Yes | 2 | 240 | 2 |
| 4 | 200 | −37 | 1 | −40 | −40 | 160 | No | | | |
| 5 | 160 | 0 | 2 | −80 | −40 | 120 | No | | | |
| 6 | 120 | 0 | 3 | −120 | −40 | 80 | No | | | |
| 7 | 80 | 0 | 4 | −160 | −40 | 40 | No | | | |
| 8 | 40 | 0 | 5 | −280 | −40 | 0 | Yes | 3 | 40 | 5 |
| 9 | 20 | +20 | 1 | −20 | −20 | 0 | Yes | 4 | 20 | 1 |
| 10 | 15 | +15 | 1 | −5 | −5 | 10 | Yes | 5 | 15 | 1 |
| 11 | 20 | +10 | 1 | +5 | +5 | 25 | Yes | 6 | 20 | 1 |
| 12 | 40 | +15 | 1 | +20 | +20 | 60 | No | | | |
| 13 | 60 | 0 | 2 | +40 | +20 | 80 | Yes | 7 | 60 | 2 |
| 14 | 72 | −8 | 1 | +12 | +12 | 84 | No | | | |
| 15 | 80 | −4 | 2 | +20 | +10 | 90 | Yes | 8 | 80 | 2 |
| 16 | 80 | −10 | 1 | 0 | 0 | 80 | No | | | |
| 17 | 80 | 0 | 2 | 0 | 0 | 80 | No | | | |

TABLE 1-continued

| Pixel | PV | ΔPD | L | ΔPV | M | PD | Point? | Point | VAL | PL |
|---|---|---|---|---|---|---|---|---|---|---|
| 18 | 80 | 0 | 3 | 0 | 0 | 80 | No | | | |
| 19 | 80 | 0 | 4 | 0 | 0 | 80 | No | | | |
| 20 | 80 | 0 | 5 | 0 | 0 | 80 | No | | | |
| 21 | 80 | 0 | 6 | 0 | 0 | 80 | No | | | |
| 22 | 80 | 0 | 7 | 0 | 0 | 80 | No | | | |
| 23 | 80 | 0 | 8 | 0 | 0 | 80 | No | | | |
| 24 | 80 | 0 | 9 | 0 | 0 | 80 | Yes | 9 | 80 | 9 |
| 25 | 85 | +5 | 1 | +5 | +5 | 90 | No | | | |
| 26 | 90 | 0 | 2 | +10 | +5 | 95 | No | | | |
| 27 | 93 | −2 | 3 | +13 | +4.3 | 97 | Yes | 10 | 93 | 3 |
| 28 | 105 | +8 | 1 | +12 | 12 | 117 | Yes | 11 | 105 | 1 |

Figure 3:
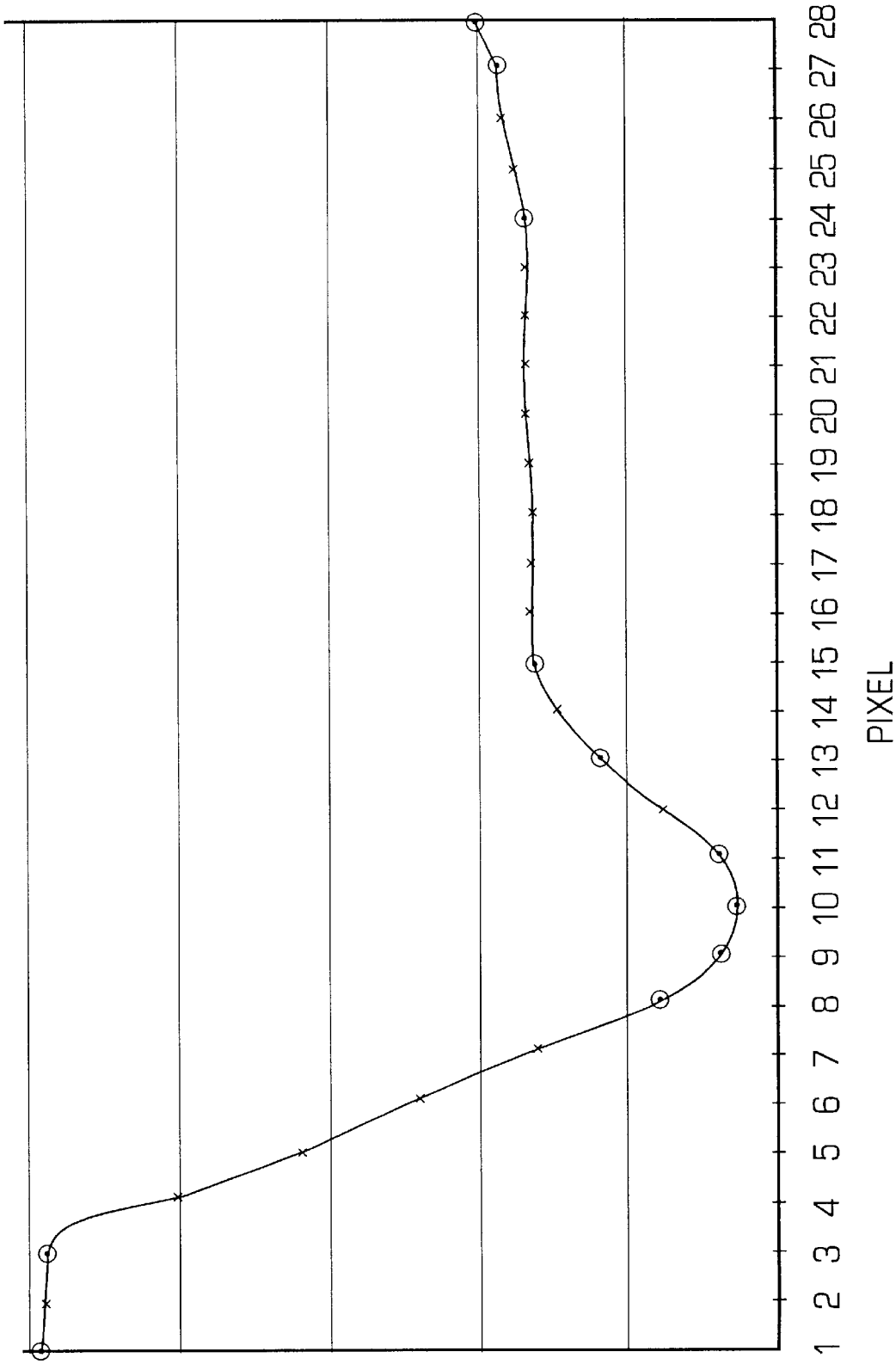
FIG. 3 is a graph of intensity values along the highlighted scan line of FIG. 1, showing the image compression points selected according to the invention.

The amplitude curve shown in FIG. 3 is not representative of any particular actual scan line or video data signal, but instead has been constructed in order to illustrate the principles of the invention. Further, although the amplitude shown in FIG. 3 has 256 levels, represented by 8 bits, it is noted that acceptable color image quality may be obtained by representing three primary (or mixing) colors using 6 bits or 64 amplitude levels for each color resulting in 18 bit color and useful compression over 24-bit color.

As mentioned before, the first pixel is always selected as a point. A point is indicated in FIG. 3 by a dot surrounded by a concentric circle. Each point is recorded as a amplitude value VAL equal to the associated pixel value and a length value PL measured as the number of pixels from the last point to the current point. Accordingly, the first point is defined by the first pixel's amplitude PV and a length L from the last point (L=O for the first point). The slope M is not relevant for this first point. The second pixel is selected and the slope M is calculated between the first point and the second pixel. The calculated slope M is used to calculate a target or predicted amplitude PD for the third pixel. If the third pixel falls within a predetermined threshold range (determined by a quality factor) from the predicted amplitude value, then the process continues to the next pixel. However, if the third pixel falls outside of the threshold range, then the previous pixel becomes a point and the third pixel is used to calculate the slope for predicting the amplitude for the subsequent pixel. A preferred threshold range for an amplitude value represented by 256 levels is +/−6 amplitude levels.

The slope M between the first and second pixels is −2 so that the predicted amplitude value PD for the third pixel is 242. The actual value PV for the third pixel is 240. The difference between the actual value PV and the predicted value PD is −2 levels, which is within the quality factor threshold range of +/−6 levels. Accordingly, the second pixel is not selected as a point.

Based on the slope between the first and third pixels, the fourth pixel, however, falls significantly outside of the threshold range. Accordingly, the third pixel becomes a point. The process is repeated through the eighth pixel (pixel #8) without another point being selected.

Figure 4A:
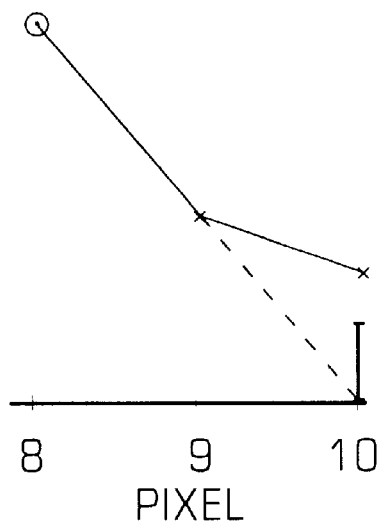
FIG. 4A is a more detailed view of the graph of FIG. 3, showing pixels 8 through 10 and a slope range for point selection, according to the invention.
Figure 4B:
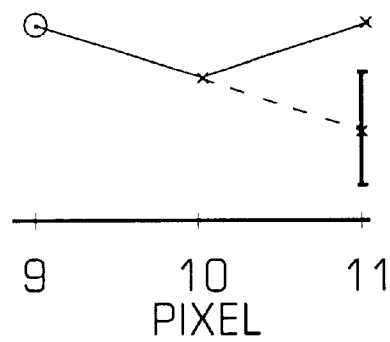
FIG. 4B is a more detailed view of the graph of FIG. 3, showing pixels 9 through 11 and a slope range for point selection, according to the invention.
Figure 4C:
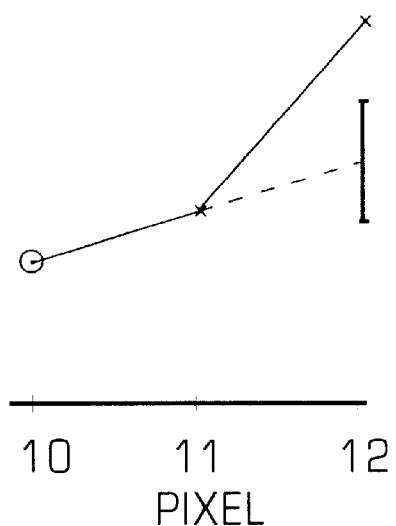
FIG. 4C is a more detailed view of the graph of FIG. 3, showing pixels 10 through 12 and a slope range for point selection, according to the invention.

As shown in FIG. 4A, pixel #9, however, lies outside the predicted value of the slope. Accordingly, pixel #8 becomes a point. As shown in FIG. 4B, the slope is calculated between the value of the point associated with pixel #8 and the amplitude value of pixel #9. Based on the newly calculated slope, the predicted value of pixel #10 is zero. The actual value of pixel #10, however, is ten, which falls outside the threshold range. Accordingly, pixel 9 becomes a point. As shown in FIG. 4B, the slope as calculated between the value of the point for pixel #9 and the amplitude of pixel #10. The newly calculated slope is used to predicted that pixel #11 will have an amplitude of 10. Based on the quality factor threshold range of the present example, the predicted amplitude of pixel #11 must fall between 4 and 16. The actual amplitude of pixel #11, however, is 20. Accordingly, pixel #10 becomes a point. As shown in FIG. 4C, a similar occurrence happens with pixel #12. Accordingly pixel #11 also becomes a point. As shown in FIG. 4E, the slope as calculated between the value of point #11 and the amplitude of pixel #12. Based on this newly calculated slope, the predicted value of pixel #13 is 60.

The value of pixel #13 falls within the threshold range and, accordingly, pixel #12 is not a point. The slope is recalculated between the value of the point for pixel #11 and the actual value of pixel 13 resulting in a predicted amplitude for pixel #14 of 80. The actual value of pixel #14 is 72, which falls outside of the threshold range. Accordingly, pixel #13 becomes a point. The slope between the value of the point for pixel #13 and the actual value of pixel #14 is calculated which results in a predicted amplitude for pixel #15 of 84. The actual value of pixel 15 is 80 which falls within the threshold range. Accordingly, pixel #14 is not a new point. The slope as calculated between pixel #13 and pixel #15 and the predicted value for pixel #16 is determined to be 90. The actual value of pixel #16 is 80. Accordingly, pixel #15 becomes a point. The slope as next calculated between pixel #15 and pixel #16, both of which have an amplitude of 80, resulting in a slope of 0.

Figure 4F:
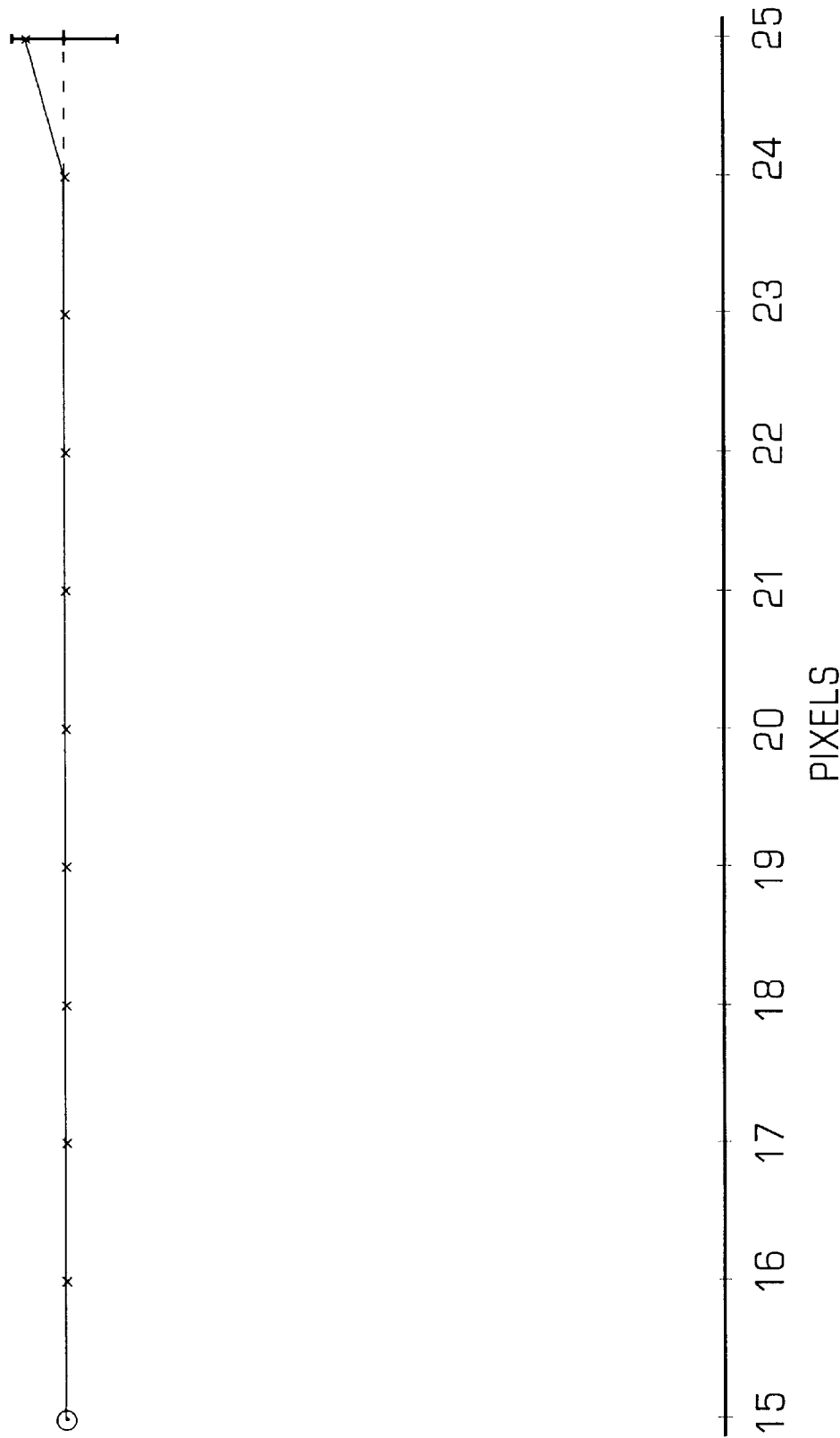
FIG. 4F is a more detailed view of the graph of FIG. 3, showing pixels 15 through 25 and a slope range for point selection, according to the invention.

As shown in FIG. 4E, this amplitude (of 80) continues through pixel #23. Normally, after eight pixels, a point is set. However, as shown in FIG. 4F, pixel #24 is at the predicted value of the slope. Accordingly, the length value L is incremented and no point is formed. At pixel #25, however, the amplitude increases by a value of 5. Normally, this value falls within the threshold range, however, because the length has exceeded 8 and pixel #25 is not at the predicted value (or defines a line segment not having the same slope of the previous line segment), the series is ended and pixel #24 becomes a point. The process continues until the end of the current scan line.

For the next scan line, the process is repeated so that the beginning of the next scan line becomes a point and the slope is calculated for the next pixel and so forth as described above.

Figure 5:
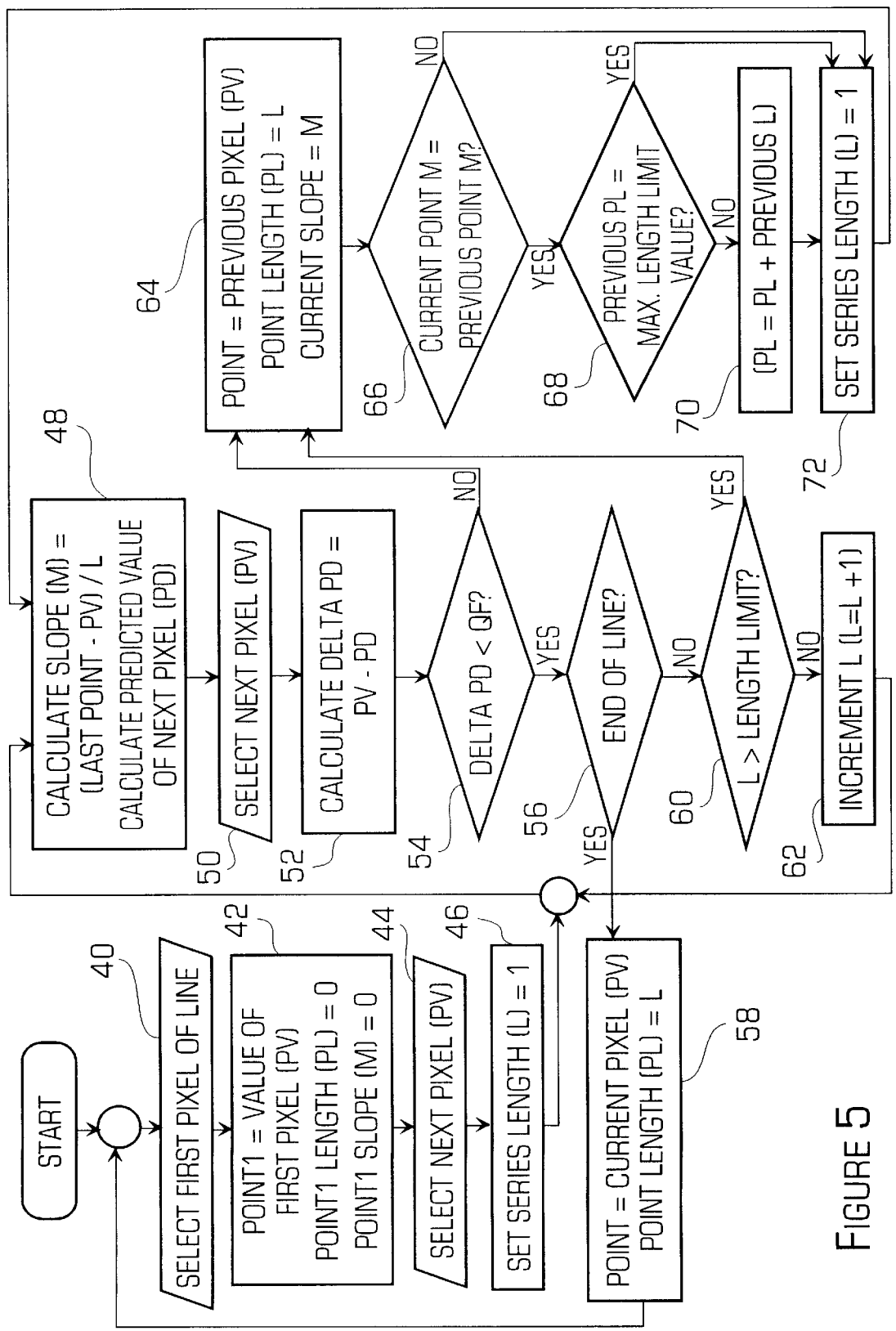
FIG. 5 is a flow diagram of a method for selecting the location of the image compression points, according to the invention.

The procedure of the point selection and encoding technique is shown in the flow chart of FIG. 5. As described above, the technique compresses a line of video by selecting the first pixel of the line (block 40) and defining it to be the first point of the line (block 42). This first point is set to a value VAL equal to the value of the first pixel and the point's associated length value PL is set to zero. The next pixel value PV is selected (block 44) and the series length L is incremented to a value of one (block 46). The slope M is then calculated between the value of the last point VAL and the value of the present pixel PV, divided by the number of pixels L between the last point and the present pixel (block 48). Using the calculated slope, the value PD of the next pixel is predicted. The next pixel is selected (block 50) and the difference (delta) between the pixel's actual value PV and the predicted value PD is calculated (block 52). If delta is not less than a predefined quality factor (block 54) then a pointing routine is called as described below.

If delta is less than the predefined quality factor, then a check is made to determine whether the pixel is at the and of the line (block 56). If the pixel is at the end of the line, then a point is defined by the current pixel's value PV and the current length L (block 58), an end-of-line (EOL) character is inserted, and the routine returns to select the next line of video. If the pixel is not at the end of the line, then a check is made to determine whether the length L exceeds a predefined length limit (block 60). If the length is not greater than the length limit, then the length value is incremented (block 62), and the slope calculation and pixel prediction routine is repeated. If the length is greater than the length limit, then the pointing routine is called.

In the pointing routine, the current point's value VAL is set of a value equal to the value PV of the previous pixel (the pixel before the pixel falling outside the quality factor limit or beyond the length limit) and the point's length PL is set to the current value of the length L (block 64). The slope M is also stored for comparison with the slope associated with the next point. However, this stored slope value is not transmitted when the point is transmitted across the data link.

Further, if the slope of the current point is equal to the slope of the last point (block 66), and if the length associated with the last slope doesn't exceed a maximum length limit value (block 68), then the previous point is eliminated and its length is accumulated with the length associated with the current point (block 70). The length is then set to one (block 72) and the slope calculation and pixel prediction routine is repeated. The maximum length limit value is selected so that the length may be represented by 6 bits or a maximum point length PL of 63.

Figure 6:
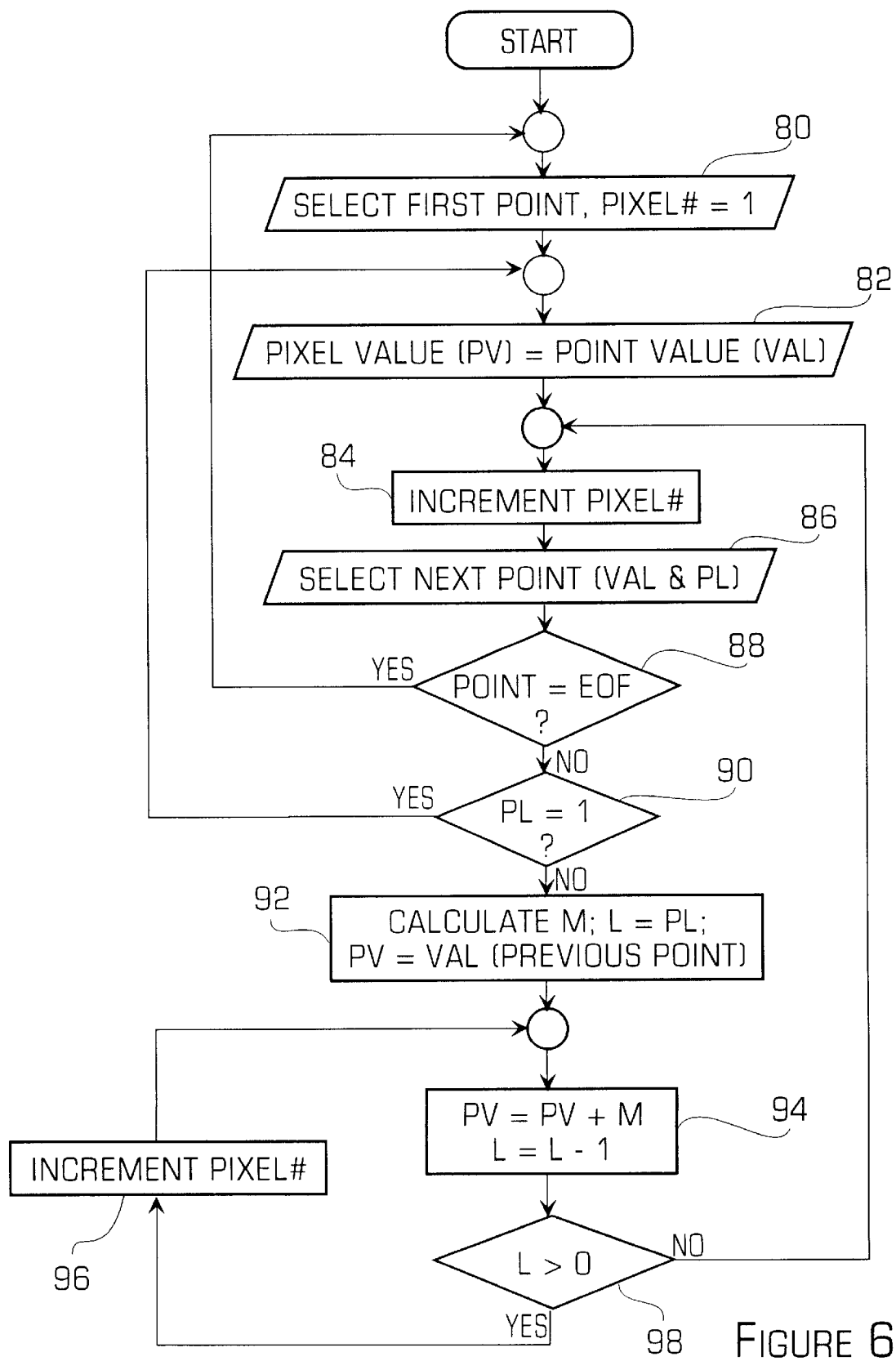
FIG. 6 is a flow diagram of a method for reconstructing an image from the image compression points, according to the invention.

The procedure of the point decoding process is shown in the flow chart of FIG. 6. Each point has a point value (VAL) and a length (PL). The first point is selected (block 80) and its value (VAL) is selected to be the value (PV) of the first pixel (block 82). The pixel number is incremented (block 84) and the next point is selected (block 86). If this point is an end of line marker, the line decoding routine is repeated for the following line (block 88). If the point length PL is 1 (block 90), then the current pixel value is set to the current point value (block 82). If the point length PL is greater then 1, then the slope M is calculated (block 92) to "fill in" the values of the remaining pixels. The slope is calculated as the difference between the current point value and the previous point value divided by the current point length. The current pixel value is set to the previous point value. The current pixel value is summed with the slope to provide an updated pixel value (block 94). The current pixel value is thus equal to the updated pixel value. The length value is decremented, the pixel number is incremented (block 96), and the pixel value is again summed with the slope until all of the pixels between the previous point and the current point have been filled in (block 98). The routine then returns to the point at which the pixel number is incremented (block 84) and the next point (VAL & PL) is selected (block 86).

Figure 7:
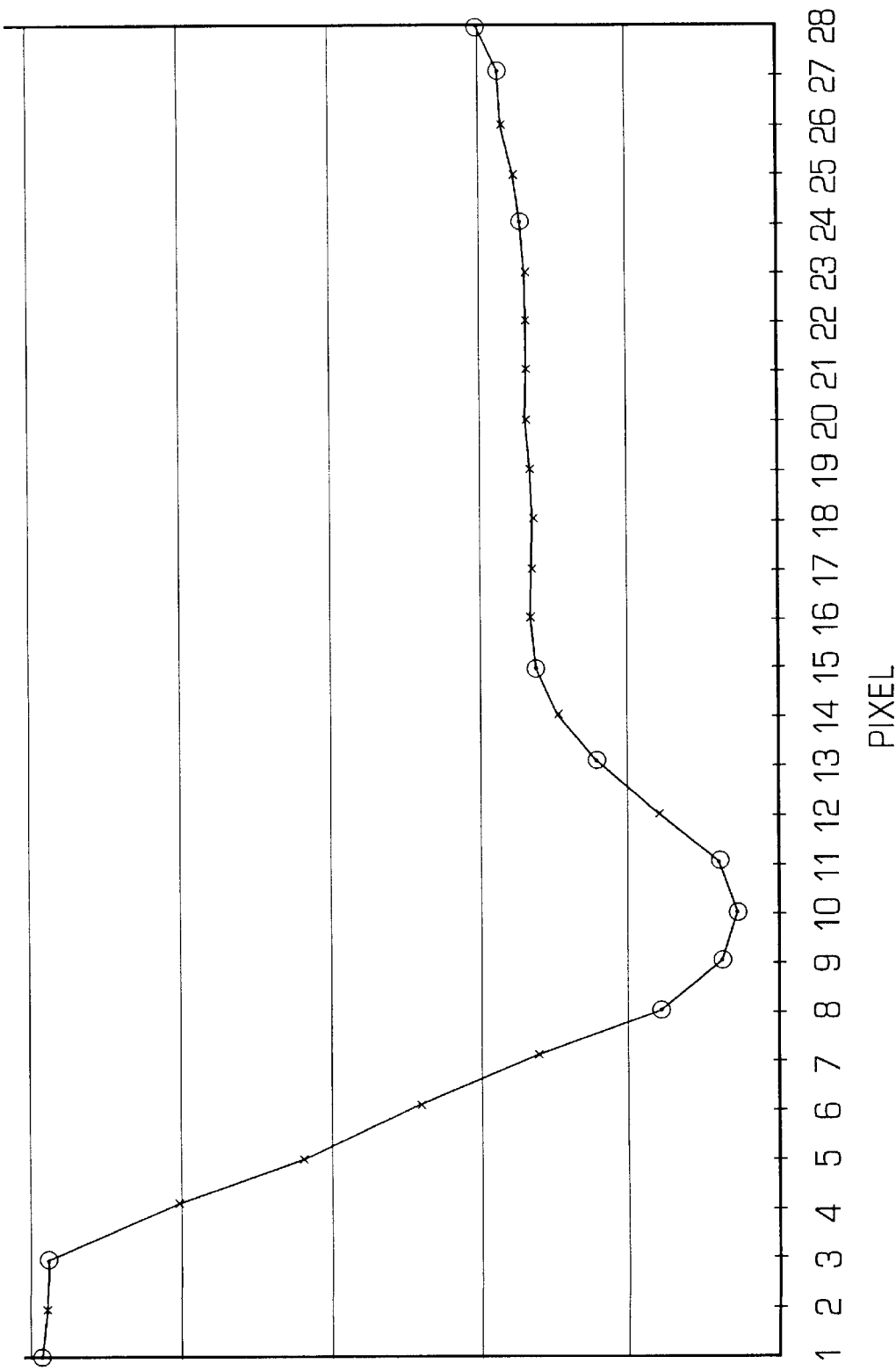
FIG. 7 is a graph of intensity values resulting from compressing and decompressing the scan line of FIG. 3, according to the invention.

For the input curve of FIG. 3, the curve resulting after the decoding process is shown in FIG. 7. The resulting curve shows that the filled-in pixels (indicated by small x's) lie on the line segments connecting the adjacent points (indicated by the dots enclosed by circles). A visual comparison between the input curve of FIG. 3 and the resulting curve of FIG. 7 indicates that the pointing technique of the invention provides good curve reconstruction.

Figure 8:
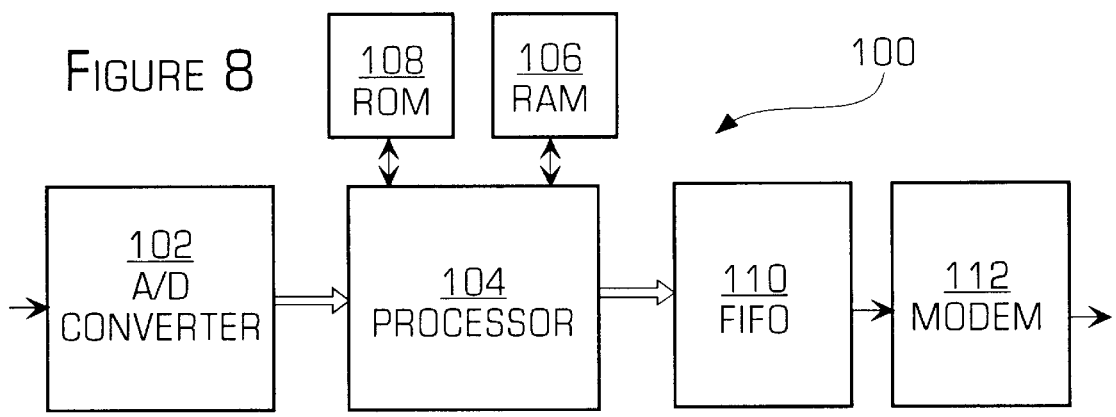
FIG. 8 is a block diagram of a digital image processor for real-time compression of video images and for transmission of the compressed images over a phone line or data link.

Apparatus 100 for implementing the compression and encoding technique is shown in FIG. 8. An analog video signal is converted to a digital signal by an analog-to-digital (A/D) converter 102. A digital processor 104 compares and sums the pixel values in accordance with the encoding techniques described above. The processor includes memory devices, i.e., random access memory (RAM) 106 and read only memory (ROM) 108, for temporary data and program storage and for implementing a look-up table for statistical encoding the pointing data using Huffman coding or the like. Statistical encoding is described in U.S. Pat. No. 4,914,508 to Music et al., which patent is incorporated herein by reference. The encoded data is forwarded to a FIFO (first in, first out) buffer 110. The buffered data is forwarded to the modem 112 for transmission across a telephone line or the like. Although a general purpose programmable processing apparatus is shown in FIG. 7, a special purpose state machine that implements the techniques of the invention may be used.

Figure 9:
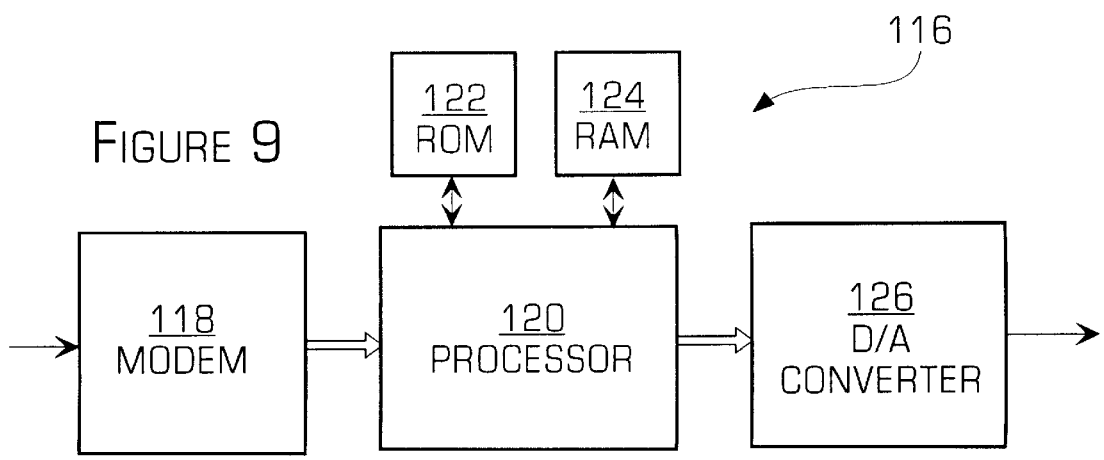
FIG. 9 is a block diagram of a digital image processor for real-time decompression and reconstruction video images received over a phone line or data link.

Apparatus 116 for implementing the decompression and decoding technique is shown in FIG. 9. A modem 118 receives the transmitted encoded data. A processor 120, receiving the encoded data, uses a lookup table stored in ROM 122 for decompressing the Huffman encoding and calculating the pixel values for pixels between the point values. Temporary data values or program instructions may be stored in RAM 124. The decoded data values are converted to analog video signals by an digital-to-analog (D/A) converter 126 for display on a video monitor or the like.

The compression technique of the invention reduces the amount of data required to reproduce or duplicate a video image, with "acceptable" image quality and motion, after transmission over a band limited data link such as a telephone line. The technique retains points that define the end points of the linear segments which are piece-wise linear approximations of the original image data. In areas of rapid slope changes or brightness transitions of the luminance component of the original video signal, the technique retains fewer points for improved compression while improving the quality of the subsequently reproduced images.

Empirical subjective studies have found that a length limits of 8 pixels and an error threshold of +/−6 amplitude levels provides a desirable tradeoff between image quality and compression ratio. Other subjective studies may find that other length limits or error thresholds may be desirable in view of the inherent tradeoffs between image quality and compression ratio.

While the foregoing has been with reference to specific embodiments of the invention, it will be appreciated by those skilled in the art that these are illustrations only and that changes in these embodiments can be made without departing from the principles of the invention, the scope of which is defined by the appended claims.

What is claimed is:

1. A method for compressing pixel data from a digitized image represented by a series of scan lines, each line having a plurality of segments, each segment comprising a plurality of pixels having corresponding pixel amplitude values, comprising the steps of:

setting a scan line segment's first pixel to be a first point and assigning to the first point an amplitude value equal to the first pixel's amplitude value and assigning to the first point's length value to a value associated only with the first point;

selecting a next pixel of the scan line segment;

calculating a slope between the amplitude value of the most recently set point for the selected pixel and the amplitude value of the selected pixel;

predicting the amplitude value of a next subsequent pixel using the calculated slope;

comparing an actual amplitude value of the next subsequent pixel with the predicted amplitude value;

setting the selected pixel to be a next point if the value of the next subsequent pixel is not within a predetermined threshold range, the next point's amplitude value being assigned to be equal to the selected pixel's amplitude value and the next point's length value being assigned to be equal to the number of pixels from the most recently set point to the next point, and the minimum point length value being one; and repeating the next pixel selecting, the slope calculating, and the amplitude value predicting steps if the value of the next subsequent pixel falls within the predetermined threshold range.

2. A method for compressing pixel data as defined in claim 1, wherein the length value associated only with the first point is zero.

3. A method for compressing pixel data as defined in claim 1, further comprising, prior to the repeating step, the steps of setting the selected pixel to be a point if the number of pixels from the most recently set point to the selected pixel exceeds a predetermined length value.

4. A method for compressing pixel data as defined in claim 3, further comprising transmitting across a data link amplitude values and length values for points thus eliminating the transmission of amplitude values of pixels not set as point to compress the pixel data.

5. A method for compressing pixel data as defined in claim 4, further comprising decompressing the image based in the transmitted point values by interpolating the pixels between the transmitted points.

6. A method for compressing pixel data as defined in claim 3, further comprising:

comparing the slope for a first line segment between the most recently set point to a currently set point with the slope for a second line segment between the most recently set point and a point set just previous to the most recently set point;

eliminating the most recently set point if the slope for the first line segment is substantially equal to the slope for the second line segment and adding the most recently set point's length value to the currently set point's length value.

7. A method for compressing pixel data as defined in claim 1, wherein the length value associated only with the first point is zero.

8. A method for compressing pixel data from a digitized image, comprising the steps of:

setting a scan line segment's first pixel to be a first point and assigning the first point's amplitude value to be equal to the first pixel's amplitude value and assigning the first point's length value to a value associated only with the first point;

selecting the scan line segment's next pixel;

setting the selected pixel to be a point if the number of pixels from the most recently set point to the selected point exceeds a predetermined length value;

repeating the selecting and setting steps until a point is set;

comparing the slope for a first line segment between the most recently set point to the currently set point with the slope for a second line segment between the most recently set point and a point just previous to the most recently set point;

eliminating the most recently set point if the slope for the first line segment is substantially equal to the slope for the second line segment and adding the most recently set point's length value to the currently set point's length value; and repeating the selecting, setting, comparing, and eliminating steps until the end of the scan line segment.

9. A method for compressing pixel data as defined in claim 8, further comprising transmitting across a data link the point's amplitude values and length values thus eliminating the transmission of amplitude values of pixels not set as point to compress the pixel data.

10. A method for compressing pixel data as defined in claim 9, further comprising decompressing the image based on the transmitted point values by interpolating the pixels between the transmitted points.

11. Apparatus for compressing pixel data from a digitized image represented by a series of scan lines, each line having a plurality of segments, each segment comprising a plurality of pixels having corresponding pixel amplitude values, comprising the steps of:

means for setting a scan line segment's first pixel to be a first point and assigning to the first point an amplitude value equal to the first pixel's amplitude value and assigning to the first point's length value to a value associated only with the first point;

means for selecting a next pixel of the scan line segment;

means for calculating a slope between the amplitude value of the most recently set point for the selected pixel and the amplitude value of the selected pixel;

means for predicting the amplitude value of a next subsequent pixel using the calculated slope;

means for comparing an actual amplitude value of the next subsequent pixel with the predicted amplitude value;

means for setting the selected pixel to be a next point if the value of the next subsequent pixel is not within a predetermined threshold range, the next point's amplitude value being assigned to be equal to the selected pixel's amplitude value and the next point's length value being assigned to be equal to the number of pixels from the most recently set point to the next point, and the minimum point length value being one; and means for repeating the next pixel selecting, the slope calculating, and the amplitude value predicting if the value of the next subsequent pixel falls within the predetermined threshold range.

12. Apparatus for compressing pixel data as defined in claim 11, further comprising means for setting the selected pixel to be a point if the number of pixels from the most recently set point to the selected pixel exceeds a redetermined length value.

13. Apparatus for compressing pixel data as defined in claim 12, further comprising means for transmitting across a data link the point's amplitude values and length values thus eliminating the transmission of amplitude values of pixels not set as point to compress the pixel data.

14. Apparatus for compressing pixel data as defined in claim 13, further comprising means for decompressing the image based in the transmitted point values by interpolating the pixels between the transmitted points.

15. Apparatus for compressing pixel data as defined in claim 12, further comprising:

means for comparing the slope for a first line segment between the most recently set point to a currently set point with the slope for a second line segment between the most recently set point and a point set just previous to the most recently set point;

means for eliminating the most recently set point if the slope for the first line segment is substantially equal to the slope for the second line segment and adding the most recently set point's length value to the currently set point's length value.

* * * * *